United States Patent [19]
Ellrodt et al.

[11] Patent Number: 5,419,408
[45] Date of Patent: May 30, 1995

[54] VEHICLE ANTI-THEFT TIRE PUNCTURING AND DEFLATING DEVICE

[76] Inventors: Richard C. Ellrodt, 19 Laurel Rd., South Salem, N.Y. 10590; Robert Greco, 132 Hillcrest Rd., Mt. Vernon, N.Y. 10552

[21] Appl. No.: 255,007

[22] Filed: Jun. 7, 1994

[51] Int. Cl.⁶ .............................................. B60R 25/00
[52] U.S. Cl. ................................. 180/287; 70/226
[58] Field of Search ............... 180/287; 70/226, 14, 70/18, 19; 116/33

[56] References Cited

U.S. PATENT DOCUMENTS

| | | | |
|---|---|---|---|
| 1,401,839 | 12/1921 | Ward | 116/33 |
| 2,737,223 | 3/1956 | Plath | 152/415 |
| 3,003,539 | 10/1961 | Tone | 152/415 |
| 3,661,115 | 5/1972 | Rosenstein | 116/33 |
| 3,910,221 | 10/1975 | Aske et al. | 116/33 |
| 4,164,131 | 8/1979 | Desmond et al. | 70/14 |
| 4,375,200 | 3/1983 | Bertani et al. | 180/287 |
| 4,651,849 | 3/1987 | Givati | 180/287 |
| 4,657,057 | 4/1987 | Ha | 152/415 |
| 4,723,426 | 2/1988 | Beaudoin | 70/14 |
| 4,818,029 | 4/1989 | Mourot et al. | 180/287 |
| 4,854,144 | 8/1989 | Davis | 70/226 |
| 5,090,223 | 2/1992 | Ruffler | 70/175 |
| 5,247,815 | 9/1993 | Caldwell | 70/19 |

*Primary Examiner*—Margaret A. Focarino
*Assistant Examiner*—Paul N. Dickson
*Attorney, Agent, or Firm*—Parmelee, Bollinger & Bramblett

[57] ABSTRACT

This is a self-retaining, adjustable, spring tension vehicle anti-theft tire puncturing and deflating assembly with a removable part for the vehicle's key, requiring no special tools for installation and operation. It is constructed of a color similar to a tire, to a size and configuration to fit inconspicuously across and within any portion of an air inflated vehicle tire tread and come into contact with the road surface thus pushing upward, puncturing and permitting relatively rapid escape of the air from the tire through a passageway.

8 Claims, 4 Drawing Sheets

VEHICLE ANTI-THEFT TIRE PUNCTURING AND DEFLATING DEVICE

BACKGROUND

1. Field of Invention

This invention relates to vehicle anti-theft or unauthorized use devices which disable the vehicles pneumatic tire by puncture.

2. Description of Prior Art

Vehicle theft or unauthorized use is a major problem for every-one concerned, to the point that a vehicle is stolen every 20 seconds in the U.S., according to the National Auto Theft Bureau—1991. Most of the time, if a vehicle is recovered, it is stripped of its component parts and only a shell remains. This affects the general public in increased insurance rates, increased police costs for paperwork, and certainly creates expenses for the individual whose vehicle has been stolen.

There are many approaches that have been developed to prevent the unauthorized use or theft of a vehicle. They generally fit into three categories. The first is the noise or alarm category that sounds or goes off when a vehicle is entered without authorization. This noise has become commonplace and is ignored by passersby. In fact, it has created the necessity for several laws to be enacted that prevent an alarm on a vehicle from sounding for more than 15 minutes. In some States, the owner of the vehicle is subject to a fine (New York State Vehicle and Traffic law #1642-14 375-47). This has created a need for another means for a vehicle theft-deterrent or unauthorized use solutions.

The second category for unauthorized use or theft prevention is accessories which lock ignitions, steering wheels, and transmissions. They are easily detected and a well-equipped thief is able to bypass or disconnect them by cutting the steering wheel, in a short period of time, thereby making them ineffective.

The third category and most effective is that which disables a vehicle or makes it very difficult to drive. These, such as ignition cutoff or gas cutoff switches, are usually detected when the vehicle is started and a skilled person can usually bypass or disconnect these deterrents without being noticed.

One manner of disabling a vehicle and making its use very difficult and noticeable is to deflate one or more tires on the vehicle when the tire is rotated—activating the device. Examples of tire deflation devices for air inflated vehicle tires are shown in U.S. Pat. No. 2,737,223 issued Mar. 6, 1956 to R. Path for Automatic Partial Deflating Apparatus for Vehicle Tires; and U.S. Pat. No. 4,657,057 issued Apr. 14, 1987 to J. S. Ha for Safety Tire Valve for Controlling Speed of Vehicle. However, the device of the former patent only partially deflates the tire allowing continued use of the vehicle, and the device of the latter patent is only responsive to excessive speeds that might not be the case in theft or unauthorized use.

The concept of tire deflation as a vehicle anti-theft or unauthorized use device is further exemplified by mechanisms shown and described in U.S. Pat. No. 3,003,539 issued Oct. 10, 1961 to RM Tone for Car Theft Tire Deflation. It is also shown in U.S. Pat. No. 3,910,221 issued Oct. 7, 1975 to RL Aske, et al for Anti-Theft Device and in U.S. Pat. No. 4,3752,000 issued Mar. 1, 1983 to GA Bertani et al for Anti-Theft Device. Another is in U.S. Pat. No. 4,8118,929 issued Apr. 4, 1989 to F. Mourot et al for Vehicle Anti-Theft Device Marking at least one Wheel Unserviceable and a Wheel Comprising the Device; and U.S. Pat. No. 5,090,223 issued Feb. 25, 1992 to John Ruffler for Car Theft Deterrent to Deflate Tire.

All of these devices use the valve of the tire as the operating factor and in each case a special tool (key) is needed. Also if the tire valve is at the 6 o'clock position, it seems it would be difficult to install. Another example of a tire deflation device is U.S. Pat. No. 4,164,131 issued Aug. 14, 1989 to John W. Desmond and Frank DiFerdinando for Automobile Anti-Theft Device. However, the device is noticeable and a special tool is needed. None of the prior patents seem to provide a means by which the authorized user of the vehicle can remember to remove the device personally before using the vehicle.

It seems that if the key or special tool is lost or misplaced it causes a considerable problem for the users of the prior art, if the devices were already installed on the vehicle. It would also seem that if the keys or tools were lost, the devices would be useless. In essence these devices need two separate factors to operate as claimed.

It also seems that all above mentioned previous art is activated or installed on a tire where it is visible and apparent. This would allow a thief or unauthorized user the possibility of bypassing the devices.

OBJECTS AND ADVANTAGES

1. It is therefore an objective of this invention to provide a new and novel anti-theft device for vehicles.

2. It is yet another objective of this invention to provide a new and novel vehicle anti-theft device that disables the vehicle.

3. Still another objective of this invention is to provide a new and novel anti-theft device that disables the use of the vehicle by deflating at least one vehicle tire by puncture.

4. It is yet still another objective of this invention to provide a new and novel vehicle anti-theft and unauthorized use device that disables the use of the vehicle by a relatively rapid deflation of at least one vehicle tire by puncturing when engaged upon the road surface.

5. Still another objective of the present invention is to provide a new and novel tire deflation puncturing device that is easy to install and release on different parts of a tire's tread.

6. Still another objective of the present invention is that it can be hidden from view and therefore, not easily detected.

7. Yet another objective of the present invention is that a memory part is involved which removes from the invention and is put on the vehicle's key shaft making the key unusable until the memory part is removed. Only the key holder will know the device is in place and thus prevents unauthorized use of vehicle.

8. A further objective of the present invention is to be adjustable to fit any tread and tire size by having a spring tension application with adjustment.

9. Yet another object of this invention is to provide a new and novel vehicle anti-theft device of a color similar to a vehicle tire, thus the presence and use is not obvious and is difficult to detect.

10. Another feature is that this device can fit into glove or console compartment when not in use.

11. Yet another object of the present invention is that no special tools or keys are needed to activate or deactivate the invention.

12. Another object of the present invention is that military or government enforcement agencies may use the invention to prevent vehicles from moving during operations when secrecy or silence is desired.

13. Briefly, in accordance with the present device these and other objects are obtained by providing a new and novel tire-deflating, anti-theft, or unauthorized use puncturing device that is specifically designed to be easily and inconspicuously placed. It is successful since it is virtually impossible to drive a vehicle with a flat tire for any distance. The authorized user of the vehicle has the means to remember the present invention is activated and can remove it before using the vehicle. Other objects, features, and advantages of the invention in its details of construction and arrangement of parts will be seen from the above, from the following description of the preferred embodiments when considered with the drawing.

DRAWING FIGURES

Figure 1:
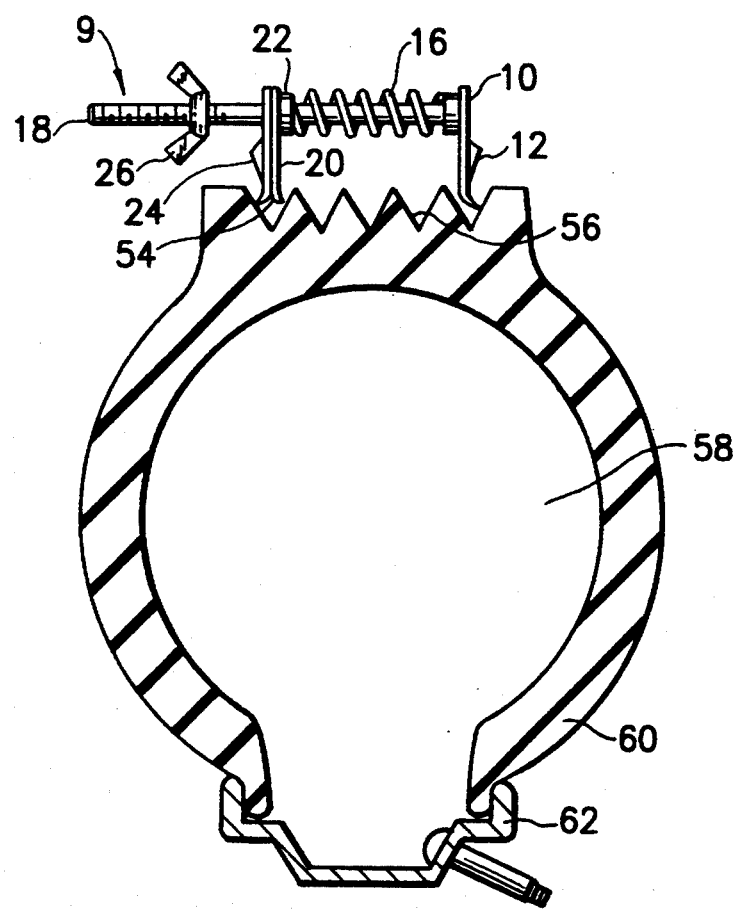
FIG. 1 is a vertical sectional view of an air inflated tire showing the anti-theft tire puncturing device incorporating the instant invention applied thereto.

| Drawing Reference Numerals Worksheet | |
|---|---|
| PART NAME | |
| 10 | Header Blade |
| 12 | Header Blade Gusset |
| 14 | Header Blade Threaded Grommet |
| 16 | Compression Spring |
| 18 | Threaded Shaft |
| 20 | Movable Puncturing Blade |
| 22 | Movable Bushing |
| 24 | Reversed Movable Puncturing Blade |
| 26 | Wing Nut |
| 28 | Angular edge on Header Blade |
| 30 | Angular edge on Puncturing Blade |
| 32 | Angular edge on Reversed Movable Blade |
| 34 | Header Blade tine |
| 36 | Movable Blade tine |
| 38 | Reversed Movable Blade tine |
| 40 | Movable Blade Gusset |
| 42 | Reversed Movable Blade Gusset |
| 44 | Movable Blade Gusset Hole |
| 46 | Reversed Movable Blade Gusset Hole |
| 48 | Poly Tubing |
| 50 | Key |
| 52 | Key Shaft |
| 54 | Air passage |
| 56 | Tire treads (cross section) |
| 58 | Tire air chamber |
| 60 | Air Inflated Tire on rim |
| 62 | Tire rim |
| 64 | Header Blade Gusset Hotel |
| 66 | |
| 68 | |
| 70 | |
| 72 | |
| 74 | |

| -continued | |
|---|---|
| Drawing Reference Numerals Worksheet | |
| PART NAME | |
| 76 | |
| 78 | |
| 80 | |
| 82 | |
| 84 | |
| 86 | |
| 88 | |
| 90 | |
| 92 | |
| 94 | |
| 96 | |
| 98 | |
| 100 | |
| 102 | |
| 104 | |
| 106 | |
| 108 | |
| 110 | |
| 112 | |
| 114 | |
| 116 | |
| 118 | |
| 120 | |
| 122 | |
| 124 | |
| 126 | |
| 128 | |
| 130 | |
| 132 | |
| 134 | |
| 136 | |
| 138 | |
| 140 | |
| 142 | |
| 144 | |
| 146 | |
| 148 | |
| 150 | |
| 152 | |
| 154 | |
| 156 | |

DESCRIPTION—FIGS. 1 TO 5

In FIG. 1 there is generally shown at (9) a tire puncturing and deflating device incorporating the instant invention as it would be applied to an air inflated vehicle tire (60). Tire (60) is of conventional construction mounted on a rim (62) with treads (56) and air chamber (58) of the kind that is generally used on cars, trucks, buses, recreational vehicles, and the like. Tire puncturing and deflating device (9) is transfixed in position between tire treads (56) by a compression spring (16) on a threaded shaft (18) with a wing nut (26) giving tension between a header blade (10) with gusset (12) and a movable puncturing blade (20) with a reversed movable puncturing blade (24) forming an air passageway (54) held together with a movable bushing (22) by spring tension of compression spring (16) applied against a wing nut (26).

Figure 2:
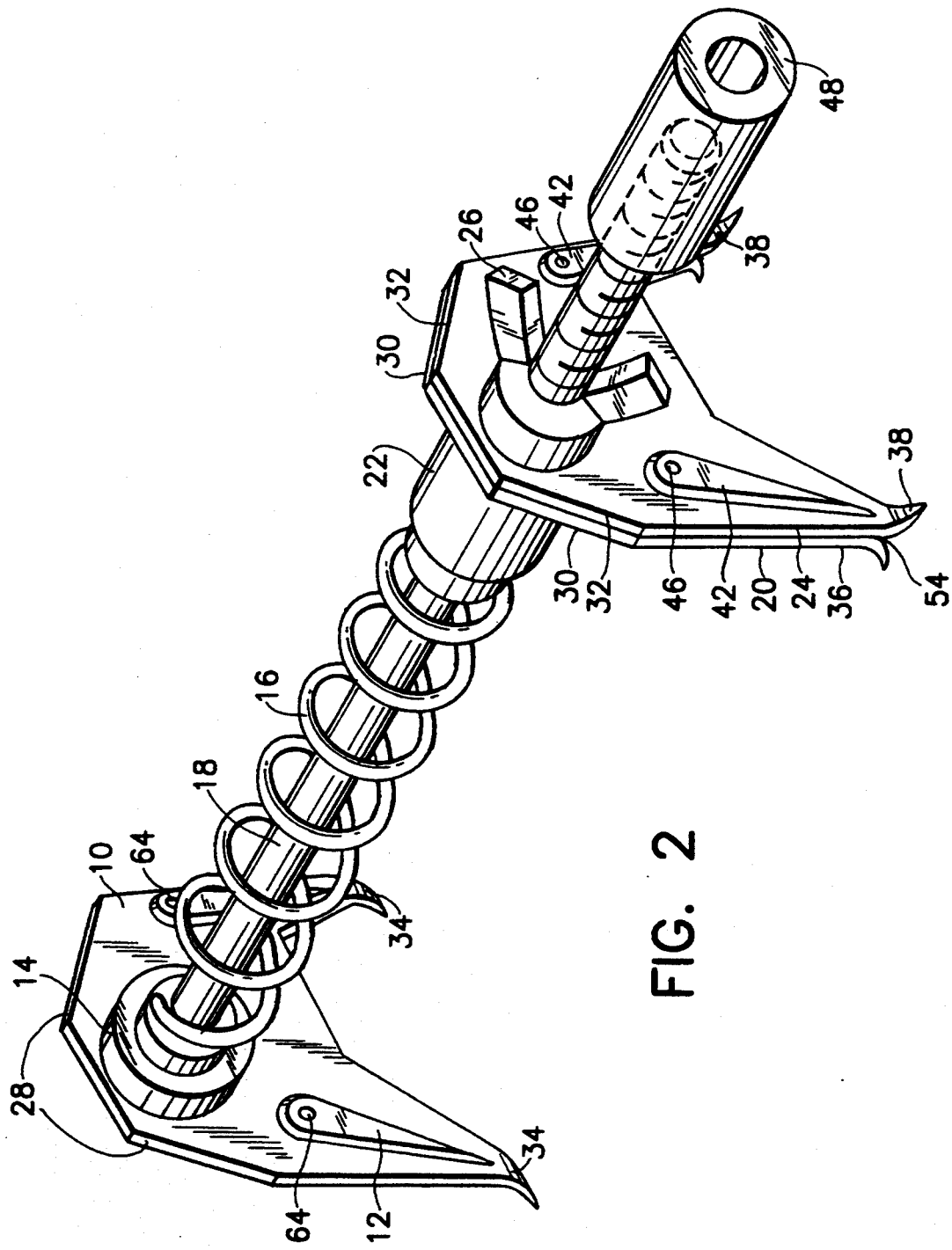
FIG. 2 is a perspective view of the tire puncturing device showing better details of FIG. 1 with angular edges to allow better contact with the road surface.

FIG. 2 shows a perspective view of tire puncturing and deflating device (9) with angular edges (28) on header blade (10) and angular edges (30) on a movable puncturing blade (20) and angular edges (32) on a reversed movable puncturing blade (24). A tine (34) is shown on both sides of the header blade (10) and a tine (36) is shown on both sides of movable puncturing blade (20) and a tine (38) is shown on a reversed movable puncturing blade (24). A movable bushing (22) is shown in FIG. 2 connecting movable puncturing blade (20) and reversed movable puncturing blade (24). Spring tension of compression spring (16) against the movable bushing (22) on the threaded shaft (18) holding the movable puncturing blade (20) and the reversed movable puncturing blade (24) is selectively adjusted by a wing nut (26) on the threaded shaft (18). A threaded grommet (14) on the header blade (10) holding the threaded shaft (18) is used to secure compression spring (16) by tension against the header blade (10) of the tire puncturing and deflating device (9).

The extended threaded shaft (18) in FIG. 2 shows a piece of poly tubing (48) which can be easily removed or replaced when needed.

In FIG. 2 a header blade gusset (12) is shown on both sides of header blade (10) with a header blade gusset hole (64) and a reversed movable puncturing blade gusset (42) is shown with a reversed movable puncturing blade gusset hole (46) on both sides of movable puncturing blade (20). In FIG. 2 the header blade (10) and movable puncturing blade (20) and reversed movable puncturing blade (24) are of the same size and shape and have the same tines (34) and (36) and (38).

Figure 3:
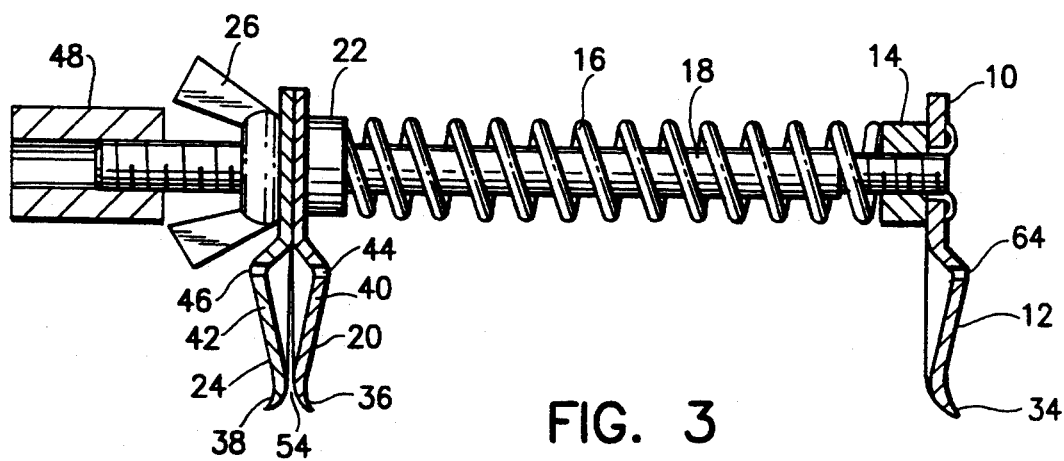
FIG. 3 is a side view of the tire puncturing device in a non tensioned position showing the puncturing blades with an air passageway on one side, and the tread gripping header blade on the opposite side.

FIG. 3 shows a side view of a tire puncturing and deflating device (9) incorporating the invention with an air passageway (54) formed by movable puncturing blade (20) and reversed movable puncturing blade (24) held by spring tension against movable bushing (22) and wing nut (26). Movable puncturing blade tines (36) and reversed movable puncturing blade tines (38) puncture air inflated tire on rim (60) allowing air to travel between tines (36) & (38) through air passage (54) formed when movable puncturing blade gusset (40) and reversed movable blade gusset (42) are put together. Air from tire is expelled through the gusset hole (44) of movable puncturing blade (20) and gusset hole (46) of reversed movable puncturing blade (24). FIG. 3 shows the header blade (10) with threaded grommet (14) and threaded shaft (18) with compression spring (16) separating movable puncturing blade (20) and reversed movable puncturing blade (24). Header blade (10) is used for holding tire puncturing and deflating device (9) on tire treads (56). Air passageway (54) is formed only when two blades (20) and (24) are positioned together. FIGS. 2 and 3 show polytubing (48) which is removable, if necessary.

Figure 4:
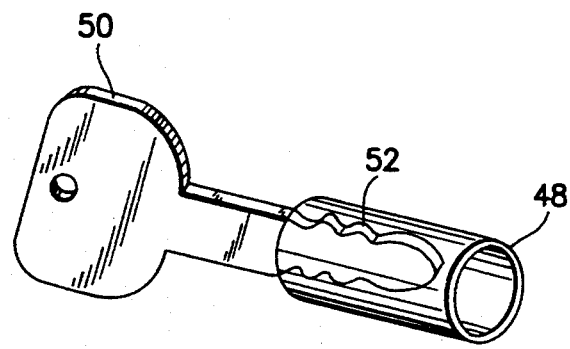
FIG. 4 is a schematic illustration of the memory tube on a key shaft, making the key useless until the tube is removed.

In FIG. 4 a key (50) is shown with polytubing (48) taken off threaded shaft (18) of FIGS. 1-3 and placed on key shaft (52). Key (50) will not be usable until polytubing (48) is removed from key shaft (52). This will remind the user that tire puncturing and deflating device (9) is affixed to tire (60) and presumably the key (50) holder will remove puncturing device (9) before operating the vehicle.

OPERATION

Figure 5A:
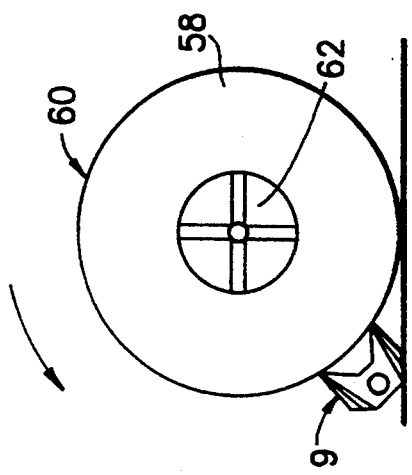
FIG. 5A, 5B and 5C are schematic illustrations of the theft deterrent puncturing device of FIGS. 1-3 showing it in use, in varying positions, on a vehicle air-inflated tire.
Figure 5B:
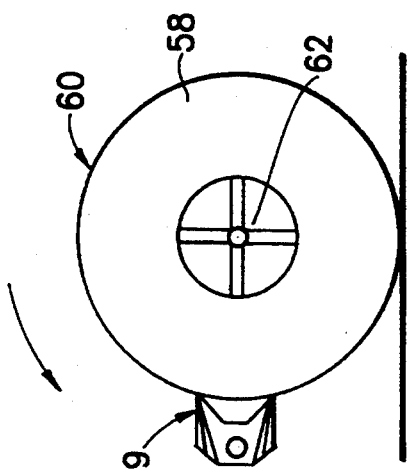
Figure 5C:
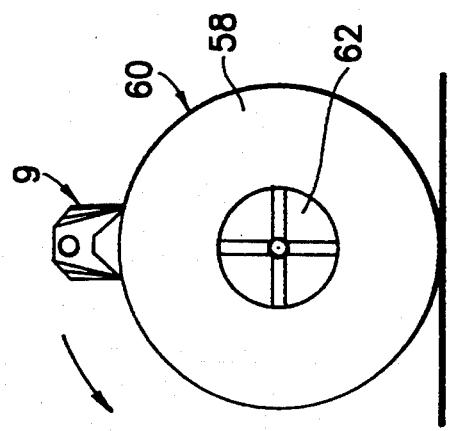

As a vehicle is driven the tire (60) FIGS. 1 and 5 with puncturing device (9) FIGS. 1 and 5 will rotate from the disposition in FIG. 5A to that of FIG. 5B and than to that of FIG. 5C. If tire (60) is rotated in the opposite direction, puncturing and deflating device (9) will rotate in that direction with tire (60) until puncturing device (9) is disposed beneath the tire (60) as shown in FIG. 5C. The weight of the vehicle as transmitted through tire (60) is such that angular edge (28) FIG. 2 on header blade (10) FIGS. 1, 2, and 3 and angular blade (30) FIG. 2 on movable puncturing blade (20) FIGS. 1, 2, and 3 and angular edge (32) FIG. 2 on reversed movable puncturing blade (24) FIGS. 1, 2, and 3 on one side are forced upwards pushing one side of the tines (36) FIGS. 1 and 2 and (38) FIGS. 1 and 2 of puncturing blade (20) and reversed puncturing blade (24) into air chamber (58) FIGS. 1 and 5 of tire (60).

The air passageway (54) FIGS. 1, 2, and 3 formed by movable puncturing blade gusset (40) FIG. 3 and reversed movable puncturing blade gusset (42) FIGS. 2 and 3 allows pressurized air to rapidly escape from air chamber (58) through puncturing blade gusset hole (44) FIG. 3 and reversed puncturing blade gusset hole (46) FIGS. 2 and 3 making tire (60) flat and the vehicle not driveable. Tines (36) and (38) allow the passageway (54) to remain open. Header Blade tine (34) FIG. 2 and 3 will also be forced into tire (60) but will not provide passageway (54) necessary to give rapid deflation of tire (60). The tire (60) is easier to repair if only one puncturing point is created but this is not always the case.

SUMMARY, RAMIFICATIONS, AND SCOPE

Thus, it will be seen that there has been provided a new and novel vehicle tire puncturing and deflation anti-theft device which is simple in construction and use, and is very effective in preventing theft or unauthorized use of a vehicle; and if an attempt is made to steal the vehicle, acts quickly and effectively to puncture and deflate the vehicle tire to which such device is applied to thereby render the vehicle not driveable.

Thus the reader will see that the puncturing and deflating device of the invention gives a new and novel approach to tire deflation that is very simple to use and provides the user with a means of remembering the device is on the tire before using the vehicle.

While the above description contains many specificities, those should not be construed as limitations on the scope of the invention but rather as an exemplification of one preferred embodiment thereof.

Many other variations are possible. For example, the spring can be a pull tension instead of a push tension or the size may be smaller or bigger if necessary to meet the changing design of tire treads. The invention can be manufactured from a combination of plastic rubber and steel of a color similar to a tire.

Thus the scope of the invention should be determined by the appended claims and their legal equivalents rather than by the examples given.

It is understood that although there has been shown and described embodiments of the invention that various modifications may be made in the details thereof without departing from the spirit as comprehended by the following claims.

We claim:

1. A vehicular anti-theft tire puncturing device adapted to be mounted between the tread of an air-inflated tire for deflating the tire on the unauthorized movement of the tire on which the device is mounted comprising:

a shaft having first and second ends thereon,
a first blade means mounted on said first end of said shaft and adapted to be mounted between the tread of an air-inflated tire,
a second movable puncturing blade means positioned near the second end of said shaft and adapted to be mounted between the tread of an air-inflated tire,
movable means mounted on said second end of said shaft for moving said second movable puncturing blade means on said shaft relative to said first blade means mounted on said shaft whereby said first blade means and second movable puncturing blade means are adapted to be adjustably spaced in order to be mounted between and across the tread of an air-inflated tire which, when the tire is rotated, will puncture the tire and thereby deter continued rapid movement of the vehicle on which the tire is mounted.

2. The vehicular anti-theft tire puncturing device as claimed in claim 1 wherein said first and second blade means have similar configurations and each have a pair of spaced legs extending downwardly from a body portion which is mounted on said shaft.

3. The vehicular anti-theft tire puncturing device as claimed in claim 2 wherein said first and second blade means each have outwardly extending tines from each of the legs adapted to engage and hold the device between the tread of a tire on which the device is positioned.

4. The vehicular anti-theft tire puncturing device as claimed in claim 3 wherein said second movable puncturing blade means includes a reversed blade means mounted contiguously on said shaft with said second blade means, said second blade means and said reversed blade means each having a gusset with a hole therein, thereby forming a passageway and an air chamber between said second blade means and said reversed blade means for permitting the air from the tire to escape when the tire is punctured.

5. The vehicular anti-theft tire puncturing device as claimed in claim 1 wherein a spring is mounted on said shaft between said first and second blade means.

6. The vehicular anti-theft tire puncturing device as claimed in claim 1 having a removable sleeve mounted on said shaft which is adapted to be removed and slipped over a transmission key of a car on which the anti-theft tire puncturing device is positioned in order to remind the user that the device has been installed and should be removed prior to operation of the vehicle.

7. The vehicular anti-theft device as claimed in claim 2 wherein said body portions of said first and second blade means each have angled edges extending in the same direction as the tire tread on which said blades are installed and thus said angled edges extend in the same direction as the rotation of the tire on which the device is installed.

8. The method of providing anti-theft protection for a vehicle having an inflated tire using a tire puncturing and deflating device having a reminder sleeve for reminding an authorized user that the device has been installed on the vehicle comprising the steps of removing the reminder sleeve for rewinding an authorized user that the device has been installed on the vehicle being protected, placing the reminder sleeve over the ignition key of the vehicle being protected, installing a tire puncturing and deflating device between the tread of the air-inflated tire of the vehicle which punctures and deflates the tire on the unauthorized rotation of the tire on which the device is installed, and removing the device from the tire by the authorized user who is reminded to do so by the sleeve on the ignition key and returning the sleeve to the device once the device is removed from the tire.

* * * * *